(12) United States Patent
Reilly et al.

(10) Patent No.: US 9,778,896 B2
(45) Date of Patent: *Oct. 3, 2017

(54) WIRELESS MUSIC PLAYBACK

(71) Applicant: Sonos, Inc., Santa Barbara, CA (US)

(72) Inventors: Jonathon Reilly, Cambridge, MA (US); Nicholas A. J. Millington, Santa Barbara, CA (US); Mark Polomski, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/803,974

(22) Filed: Jul. 20, 2015

(65) Prior Publication Data

US 2015/0324165 A1  Nov. 12, 2015

Related U.S. Application Data

(63) Continuation of application No. 13/656,050, filed on Oct. 19, 2012, now Pat. No. 9,094,706.

(Continued)

(51) Int. Cl.
*G06F 13/36* (2006.01)
*G06F 3/16* (2006.01)
(Continued)

(52) U.S. Cl.
CPC .............. *G06F 3/16* (2013.01); *G06F 1/1632* (2013.01); *G06F 13/00* (2013.01);
(Continued)

(58) Field of Classification Search
None
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 0153994 | 7/2001 |

(Continued)

OTHER PUBLICATIONS

Amazon.com Listing, "Sonos Wireless Dock 100 for iPod and iPhone (Discontinued by Manufacturer)," retrieved from internet Sep. 3, 2014 <http://www.amazon.com/Sonos-Wireless-iPhone-Discontinued-Manufacturer/dp/B0047T7AGM>, 7 Pages.

(Continued)

*Primary Examiner* — Henry Tsai
*Assistant Examiner* — Aurangzeb Hassan
(74) *Attorney, Agent, or Firm* — McDonnell Boehnen Hulbert & Berghoff LLP

(57) ABSTRACT

An example method includes detecting a connection between a dock interface of a first zone player and a portable device, the dock interface providing communication between the portable device and a second zone player, wherein the second zone player is part of a first set of zones in a playback network that does not include the first zone player; responsive to the detection, transmitting data to cause the second zone player to modify parameter(s) of the second zone player according to a zone scene; responsive to the detection, determining that the portable device was playing a media item; and causing, via the dock interface, playback of the media item from the portable device by the first zone player and the second zone player while the second zone player is in the second set of zones.

18 Claims, 9 Drawing Sheets

Related U.S. Application Data

(60) Provisional application No. 61/550,201, filed on Oct. 21, 2011.

(51) Int. Cl.
| | | |
|---|---|---|
| *G06F 13/00* | (2006.01) | |
| *G06F 1/16* | (2006.01) | |
| *H04N 21/41* | (2011.01) | |
| *H04N 21/414* | (2011.01) | |
| *H04N 21/436* | (2011.01) | |
| *G06F 13/364* | (2006.01) | |
| *G06F 13/374* | (2006.01) | |
| *G06F 13/18* | (2006.01) | |

(52) U.S. Cl.
CPC ... *H04N 21/4126* (2013.01); *H04N 21/41407* (2013.01); *H04N 21/43615* (2013.01); *G06F 13/18* (2013.01); *G06F 13/364* (2013.01); *G06F 13/374* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,907,458 | B2 | 6/2005 | Tomassetti et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,218,708 | B2 | 5/2007 | Berezowski et al. |
| 7,236,773 | B2 | 6/2007 | Thomas |
| 7,295,548 | B2 | 11/2007 | Blank et al. |
| 7,373,414 | B2 | 5/2008 | Evron et al. |
| 7,483,538 | B2 | 1/2009 | McCarty et al. |
| 7,571,014 | B1* | 8/2009 | Lambourne ............ H04R 27/00 700/94 |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,668,990 | B2 | 2/2010 | Krzyzanowski et al. |
| 7,689,197 | B2 | 3/2010 | Laude et al. |
| 7,821,963 | B2 | 10/2010 | Guan |
| 7,853,341 | B2 | 12/2010 | McCarty et al. |
| 7,895,378 | B2 | 2/2011 | Holden et al. |
| 7,913,020 | B2 | 3/2011 | Acosta et al. |
| 7,944,858 | B2 | 5/2011 | Tabery et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,060,014 | B2 | 11/2011 | Ueda et al. |
| 8,068,925 | B2 | 11/2011 | Mckillop et al. |
| 8,103,009 | B2 | 1/2012 | McCarty et al. |
| 8,208,917 | B2 | 6/2012 | Ueda |
| 8,234,395 | B2 | 7/2012 | Millington |
| 8,260,998 | B2 | 9/2012 | Ganesh et al. |
| 8,290,603 | B1 | 10/2012 | Lambourne |
| 8,320,832 | B2 | 11/2012 | Kang et al. |
| 8,326,951 | B1 | 12/2012 | Millington et al. |
| 8,443,038 | B2 | 5/2013 | Robbin et al. |
| 8,483,853 | B1 | 7/2013 | Lambourne |
| 8,588,949 | B2 | 11/2013 | Lambourne et al. |
| 8,683,070 | B2 | 3/2014 | Gelter et al. |
| 8,688,431 | B2 | 4/2014 | Lyons et al. |
| 8,705,780 | B2 | 4/2014 | Yoon et al. |
| 8,811,908 | B2 | 8/2014 | Yoon et al. |
| 2001/0042107 | A1 | 11/2001 | Palm |
| 2002/0003548 | A1 | 1/2002 | Krusche et al. |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2003/0210796 | A1 | 11/2003 | McCarty et al. |
| 2004/0024478 | A1 | 2/2004 | Hans et al. |
| 2004/0047300 | A1 | 3/2004 | Enomoto et al. |
| 2005/0289224 | A1 | 12/2005 | Deslippe et al. |
| 2006/0052097 | A1 | 3/2006 | Struthers et al. |
| 2007/0047469 | A1 | 3/2007 | Vasseur et al. |
| 2007/0142022 | A1* | 6/2007 | Madonna ............... H04N 7/163 455/352 |
| 2007/0142944 | A1 | 6/2007 | Goldberg et al. |
| 2008/0075295 | A1 | 3/2008 | Mayman et al. |
| 2008/0089246 | A1 | 4/2008 | Ghanwani et al. |
| 2008/0089667 | A1 | 4/2008 | Grady et al. |
| 2008/0109095 | A1 | 5/2008 | Braithwaite et al. |
| 2008/0159565 | A1 | 7/2008 | Kim |
| 2009/0171487 | A1* | 7/2009 | Wilhelm ................ G11B 27/10 700/94 |
| 2009/0174998 | A1 | 7/2009 | Struthers et al. |
| 2010/0087089 | A1 | 4/2010 | Struthers et al. |
| 2012/0087503 | A1 | 4/2012 | Watson et al. |
| 2012/0189140 | A1 | 7/2012 | Hughes |
| 2013/0080599 | A1 | 3/2013 | Ko et al. |
| 2013/0080955 | A1 | 3/2013 | Reimann et al. |
| 2013/0094667 | A1 | 4/2013 | Millington et al. |
| 2013/0103873 | A1 | 4/2013 | Reilly et al. |
| 2013/0151592 | A1 | 6/2013 | Jensen et al. |
| 2015/0054519 | A1 | 2/2015 | Tomonaga et al. |

FOREIGN PATENT DOCUMENTS

| | | |
|---|---|---|
| WO | 03093950 A2 | 11/2003 |
| WO | 2005013047 | 2/2005 |

OTHER PUBLICATIONS

Bluetooth, "Specification of the Bluetooth System: The ad hoc Scatternet for affordable and highly functional wireless connectivity," Core, Version 1.0 A, Jul. 26, 1999, 1068 pages (Document uploaded in 7 different files: NPL2_part1 pp. 1 to 150; NPL2_part2 pp. 151 to 300; NPL2_part3 pp. 301 to 450; NPL2_part4 pp. 451 to 600; NPL2_part5 pp. 601 to 750; NPL2_part6 pp. 751 to 900; and NPL2_part7 pp. 901 to 1068).

Bluetooth. "Specification of the Bluetooth System: Wireless connections made easy," Core, Version 1.0 B, Dec. 1, 1999, 1081 pages (Document uploaded in 8 different files: NPL2_part1 pp. 1 to 150; NPL2_part2 pp. 151 to 300; NPL2_part3 pp. 301 to 450; NPL2_part4 pp. 451 to 600; NPL2_part5 pp. 601 to 700; NPL2_part6 pp. 701 to 850; NPL2_part7 pp. 851 to 1000; and NPL2_part8 pp. 1001 to 1076).

Dell, Inc., "Dell Digital Audio Receiver: Reference Guide," Jun. 2000, 70 pages.

Dell, Inc., "Start Here," Jun. 2000, 2 pages.

Higgins, et al., "Presentations at WinHEC 2000," May 2000, 138 pages.

Internation Searching Authority, "Search Report," issued in connection with International Patent Application No. PCT/US2013/048448, dated Oct. 29, 2013, 5 pages.

International Searching Authority, "Written Opinion," issued in connection with International Patent Application No. PCT/US2013/048448, dated Oct. 29, 2013, 4 pages.

Jo J., et al., "Synchronized One-to-many Media Streaming with Adaptive Playout Control," Proceedings of SPIE, 2002, vol. 4861, pp. 71-82.

Jonathan, "New: NuVo Wall-Mount NuVoDock for iPods," online Jun. 15, 2010, retrieved from internet Sep. 4, 2014 <http://homecontrolsblog.wordpress.com/2010/06/15/new-nuvo-wall-mount-nuvodock-for-ipods>, 2 pages.

Jones, Stephen, "Dell Digital Audio Receiver: Digital upgrade for your analog stereo," Analog Stereo, Jun. 24, 2000 <http://www.reviewsonline.com/articles/961906864.htm> retrieved Jun. 18, 2014, 2 pages.

(56) References Cited

OTHER PUBLICATIONS

Louderback, Jim, "Affordable Audio Receiver Furnishes Homes With MP3," TechTV Vault, Jun. 28, 2000 <http://www.g4tv.com/articles/17923/affordable-audio-receiver-furnishes-homes-with-mp3/> retrieved Jul. 10, 2014, 2 pages.
Microsoft Corp., "Universal Plug and Play Device Architecture," Jun. 8, 2000, version 1.0, pp. 1-54.
Nuvo, "Source Equipment," PRD-211-0818, 12 pages.
Palm, Inc., "Handbook for the Palm VII Handheld," May 2000, 311 pages.
Ricker, Thomas, "Sonos Wireless Dock for iPod and iPhone launched at gdgt party," Engadget, online Sep. 23, 2010, retrieved from internet Sep. 3, 2014 <http://www.engadget.com/2010/09/23/sonos-wireless-dock-for-ipod-and-iphone-launched-at-gdgt-party>, 10 pages.
Russound, "BGD1 iBridge Dock instruction Manual," Apr. 6, 2006, 8 pages.
Russound, "CAV6.6 Six-Zone, Six-Source Audio-Video Controller Amplifier Instruction Manual," Jun. 12, 2008, 116 pages.
Russound, "TCH1 RNET Touchpoint Installation Manual," Revision 2, Apr. 7, 2010, 20 pages.
Russound, "UNO-TS2 Touchscreen Instruction Manual," Apr. 3, 2006, 28 pages.
Sonos, Inc., "Sonos Introduces the Sonos Wireless Dock," press release, Sep. 22, 2010, 1 pages.
Sonos, Inc., "Sonos Multi-Room Music System User Guide," Version 090401, Apr. 1, 2009, 256 pages.
Sonos, Inc., "The Sonos set-up at #gdgt Boston for tonight. Can you spot the new Sonos product? http://twitpic.com/2qz9jk," [Tweet]. Sep. 22, 2010, retrieved from internet Sep. 4, 2014 <http://twitter.com/Sonos/status/25248202107>, 2 pages.
Sonos, Inc., "Sonos Wireless Dock Product Guide," Nov. 2014, 13 pages.
Sonos, Inc., "Sonos Wireless Dock 100 WD100," 2010, 2 pages.
United States Patent and Trademark Office, "Non-Final Office action," issued in connection with U.S. Appl. No. 11/853,790, dated Mar. 8, 2011, 11 pages.
United States Patent and Trademark Office, "Final Office action," issued in connection with U.S. Appl. No. 11/853,790, dated Oct. 13, 2011, 11 pages.
United States Patent and Trademark Office, "Advisory action," issued in connection with U.S. Appl. No. 11/853,790, dated Dec. 22, 2011, 3 pages.
United States Patent and Trademark Office, "Notice of Allowance," issued in connection with U.S. Appl. No. 11/853,790, dated Apr. 18, 2013, 8 pages.
United States Patent and Trademark Office, "Non-Final Office Action," issued in connection with U.S. Appl. No. 13/656,050, dated Sep. 11, 2014, 49 pages.
United States Patent and Trademark Office, "Final Office Action," issued in connection with U.S. Appl. No. 13/656,050, dated Jan. 5, 2015, 53 pages.
United States Patent and Trademark Office, "Notice of Allowance," issued in connection with U.S. Appl. No. 13/656,050, dated Mar. 27, 2015, 68 pages.
Voyetra Turtle Beach, Inc., "AudioTron Quick Start Guide, Version 1.0," Mar. 2001, 24 pages.
Voyetra Turtle Beach, Inc., "AudioTron Reference Manual, Version 3.0," May 2002, 70 pages.
Voyetra Turtle Beach, Inc., "AudioTron Setup Guide, Version 3.0," May 2002, 38 pages.
Yamaha, "Yamaha DME 32: Owner's Manual," copyright 2001, 296 pages.
"Sonos Wireless Dock Product Guide," Version 100101, Sofas, Inc. Oct. 10, 2001, 196 pages.
Sonos [@Sonos]. "The Sonos set-up at #gdgt Boston for tonight. Can you spot the new Sonos product? http://twitpic.com/2qz9jk". [Tweet]. Sep. 22, 2010. Retrieved from Internet Sep. 4, 2014. <http://twitter.com/Sonos/status/25248202107> 1 page.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

WIRELESS MUSIC PLAYBACK

CROSS-REFERENCE TO RELATED APPLICATIONS

This patent claims priority to U.S. Non-Provisional patent application Ser. No. 13/656,050, which was filed on Oct. 19, 2012, entitled "Systems and Methods for Wireless Music Playback," U.S. Provisional Application Ser. No. 61/550,201, entitled "Systems and Methods for Wireless Music Playback," which was filed on Oct. 21, 2011, both of which are hereby incorporated by reference in their entirety for all purposes.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
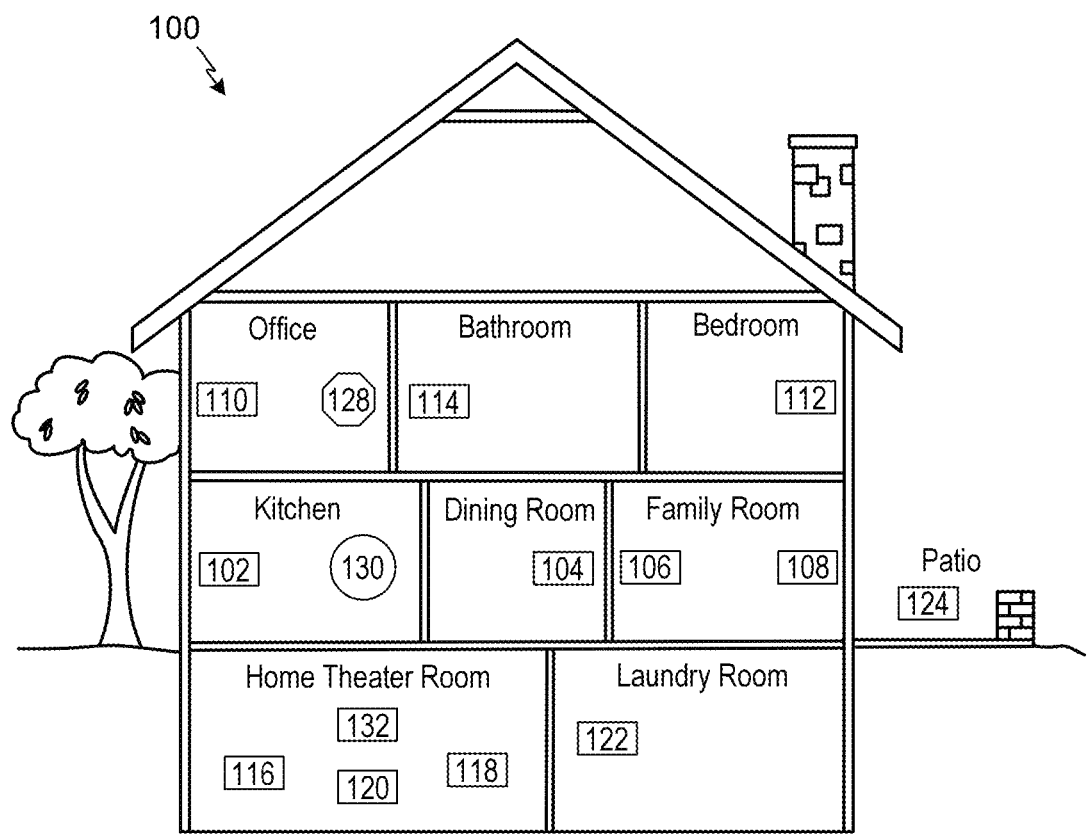
FIG. 1 shows an example configuration in which certain embodiments may be practiced.

In addition, the drawings are for the purpose of illustrating example embodiments, but it is understood that the present disclosure is not limited to the arrangements and instrumentality shown in the drawings.

DETAILED DESCRIPTION

I. Overview

Wired or wireless networks can be used to connect one or more multimedia playback devices for a home or other location playback network (e.g., a home music system). Certain examples provide automatic configuration of parameters of a playback device to be coupled to a network with reduced or minimum human intervention. For example, a wired and/or wireless ad-hoc network is established to facilitate communications among a group of devices. When a new device is added to the network, a rudimentary communication path is initially established between one of the devices ("first device") in the network and the new device ("second device") such that parameters (e.g., service set identifier (SSID), Basic Service Set Identification (BSSID), Wired Equivalent Privacy (WEP) security, channel frequency, and so on) can be exchanged for the new device to function properly in the network. To help ensure the parameters are exchanged in a secure fashion, an additional public security procedure can be used between the two devices, for example.

Certain examples provide a network, such as a wireless network (e.g., a wireless mesh network) used to connect multimedia playback devices, also referred to herein as zone players. A controller, such as a controller running on a smart phone (e.g., an ANDROID™ smartphone, and Apple IPHONE™, and Apple IPAD™, and so on), a controller running on a personal computer, a dedicated controller (e.g., a Sonos CR 200™), and so on, can be used to control music playback and/or other activity on the one or more zone players connected to the network.

Example systems, methods, apparatus, and articles of manufacture disclosed herein provide for a dock interface to connect a mobile playback device to a playback network.

Embodiments of the systems, methods, apparatus, and articles of manufacture disclosed herein provide control for audio playback devices. As described in greater detail below, the systems, methods, apparatus, and articles of manufacture disclosed herein provide users of a multimedia playback device with a wireless dock to connect the multimedia playback device with other playback devices on a playback network.

In certain embodiments, a method of connecting a device to a playback network includes enabling synchronization, via a dock interface, of a first playback device with a second playback device connected to a playback network. The example method includes facilitating, via the dock interface upon receipt of a selection of content included with the first playback device, playback of the selected content from the first playback device by the second playback device.

In certain embodiments, content on the first playback device includes stored audio tracks. In certain embodiments, content on the first playback device includes streamed music.

In certain embodiments, the first playback device includes a mobile playback device. In certain embodiments, the second playback device is one of a plurality of playback devices associated with at least one group organized with respect to the playback network. In certain embodiments, the dock interface enables the first playback device to function as a same type of device as the second playback device on the playback network.

In certain embodiments, the example method includes facilitating, during playback of content from the first playback device, charging of a battery of the first playback device.

Certain embodiments provide a playback system including a dock interface to accept connection with a first playback device, the dock interface configured to connect to a playback network, the first playback device including content for playback. In the example system, the dock interface is configured to enable synchronization, via the dock interface, of the first playback device with a second playback device connected to the playback network and facilitate, via the dock interface upon receipt of a selection of content included with the first playback device, playback of the selected content from the first playback device by the second playback device.

In certain embodiments, content on the first playback device includes at least one of stored audio tracks and streaming music. In certain embodiments, the first playback device includes a mobile playback device. In certain embodiments, the second playback device is one of a plurality of playback devices associated with at least one group organized with respect to the playback network. In certain embodiments, the dock interface is to enable the first playback device to function as a same type of device as the second playback device on the playback network. In certain embodiments, the dock interface is to facilitate control of the second playback device via the first playback device.

In certain embodiments, the example system includes a power connection to facilitate, during playback of content from the first playback device, charging of a battery of the first playback device. In certain embodiments, the example system includes a network connector to initiate an automated connection of the dock apparatus to the playback network.

Certain embodiments provide a wireless dock apparatus including a docking connection to enable a portable playback device to be connected to the dock apparatus and a network communication interface to enable the portable playback device to connect to a playback network via the dock apparatus, the network communication interface to provide content from the portable playback device to at least one network playback device for playback of the content via the playback network.

In certain embodiments, the example dock apparatus includes a network connection button to initiate an automated connection of the dock apparatus to the playback network. In certain embodiments, the example dock apparatus includes a status indicator to indicate a network connection status of the dock apparatus. In certain embodiments, the example dock apparatus includes a volume control to control a volume of playback of the content from the portable playback device via the playback network. In certain embodiments, the example dock apparatus includes a power connection to charge the portable playback device when the portable playback device is connected to the dock apparatus.

II. An Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. System configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
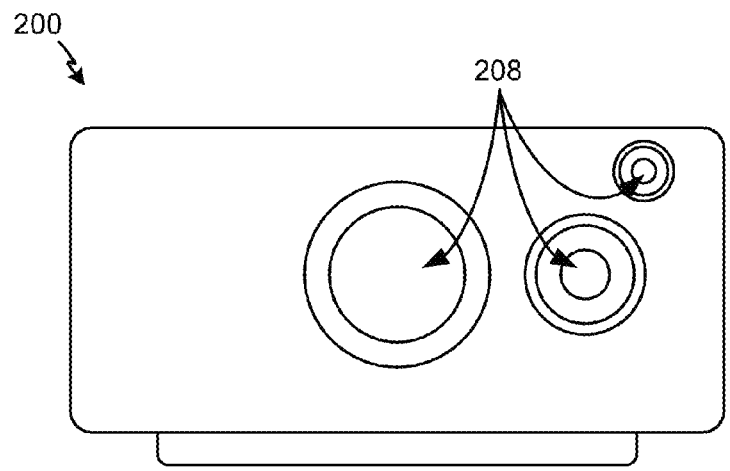
FIG. 2A shows an illustration of an example zone player having a built-in amplifier and speakers.
Figure 2B:
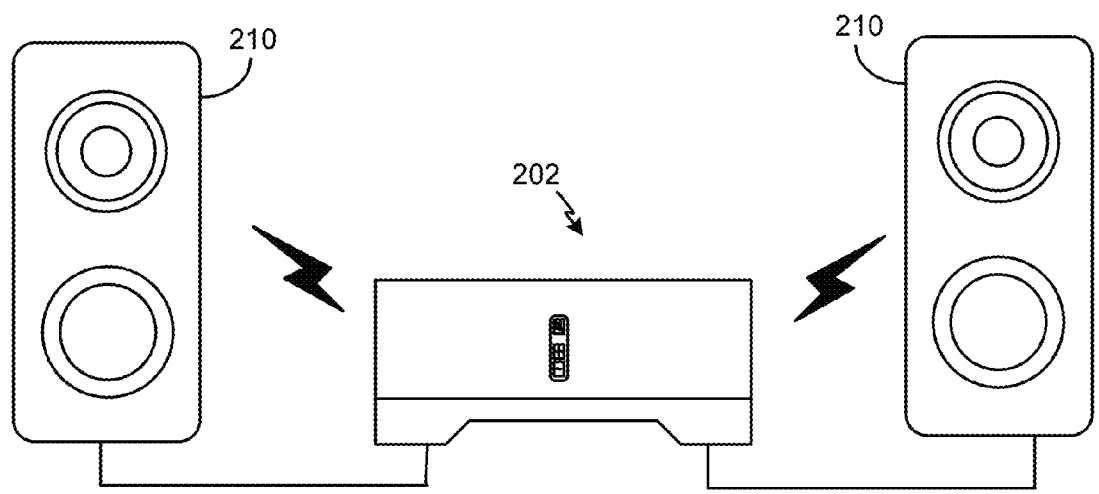
FIG. 2B shows an illustration of an example zone player having a built-in amplifier and connected to external speakers.
Figure 2C:
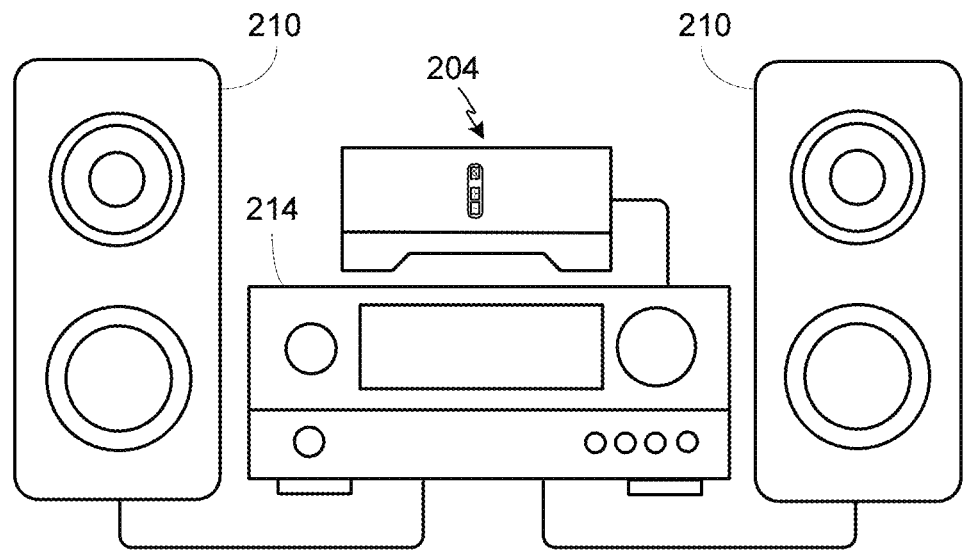
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on.

b. Example Controllers

Figure 3:
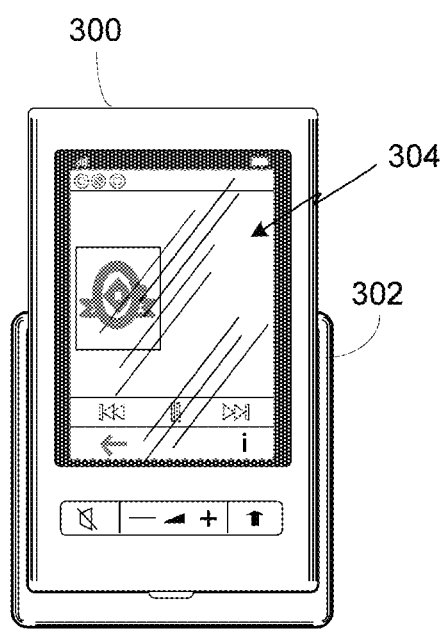
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128. Furthermore, an application running on any network-enabled portable devices, such as an IPHONE®, IPAD®, ANDROID™ powered phone, or any other smart phone or network-enabled device can be used as a controller by connecting to the data network 128. An application running on a laptop or desktop PC or Mac can also be used as a controller. Example controllers include a "SONOS® Controller 200," "SONOS® Controller for IPHONE®," "SONOS® Controller for IPAD®," "SONOS® Controller for ANDROID™ "SONOS® Controller for MAC™ or PC," which are offered by Sonos, Inc. of Santa Barbara, Calif. The flexibility of such an application and its ability to be ported to a new type of portable device is advantageous.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE®, IPAD®, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS Controller for ANDROID™," "SONOS Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
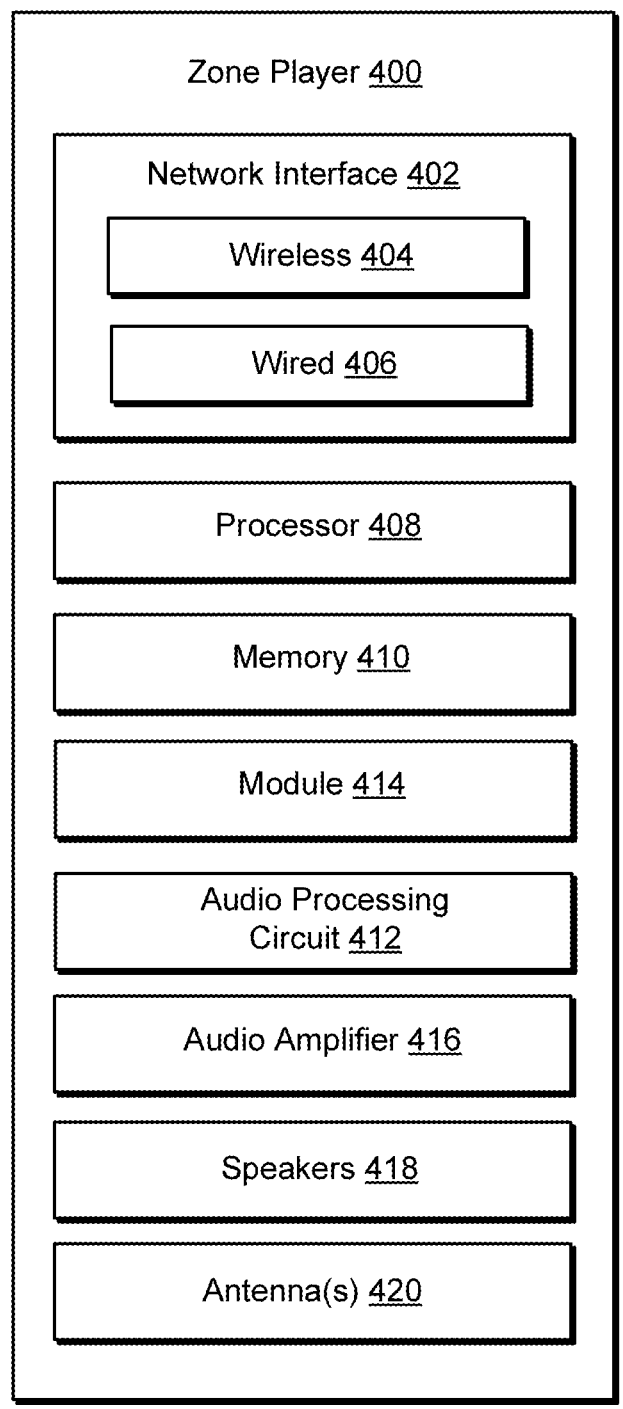
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5.

IV. Example Controller

Figure 5:
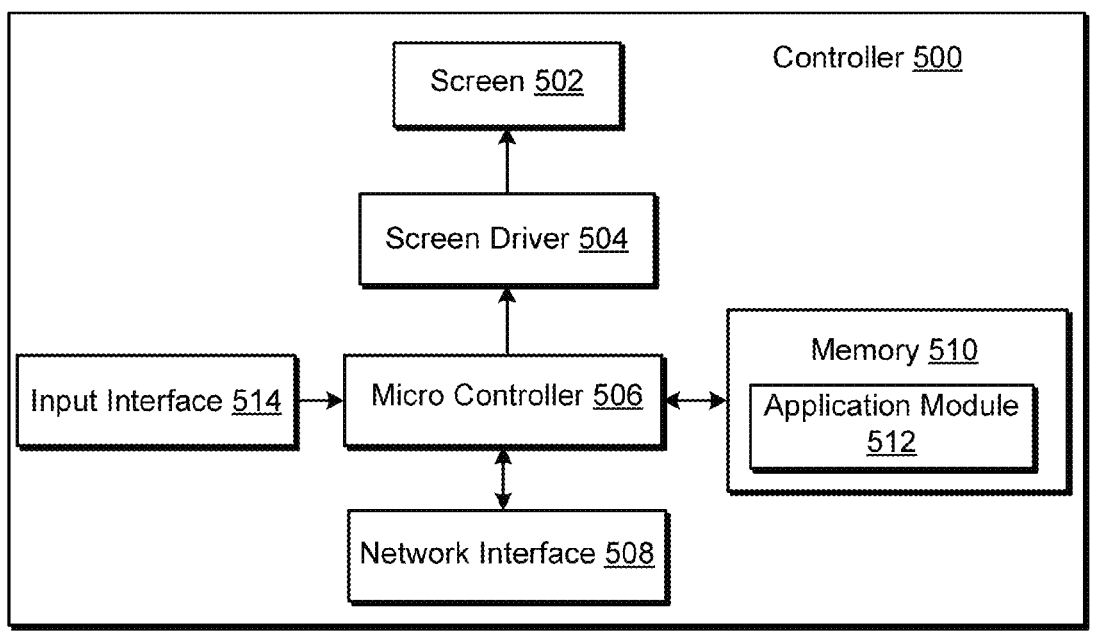
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
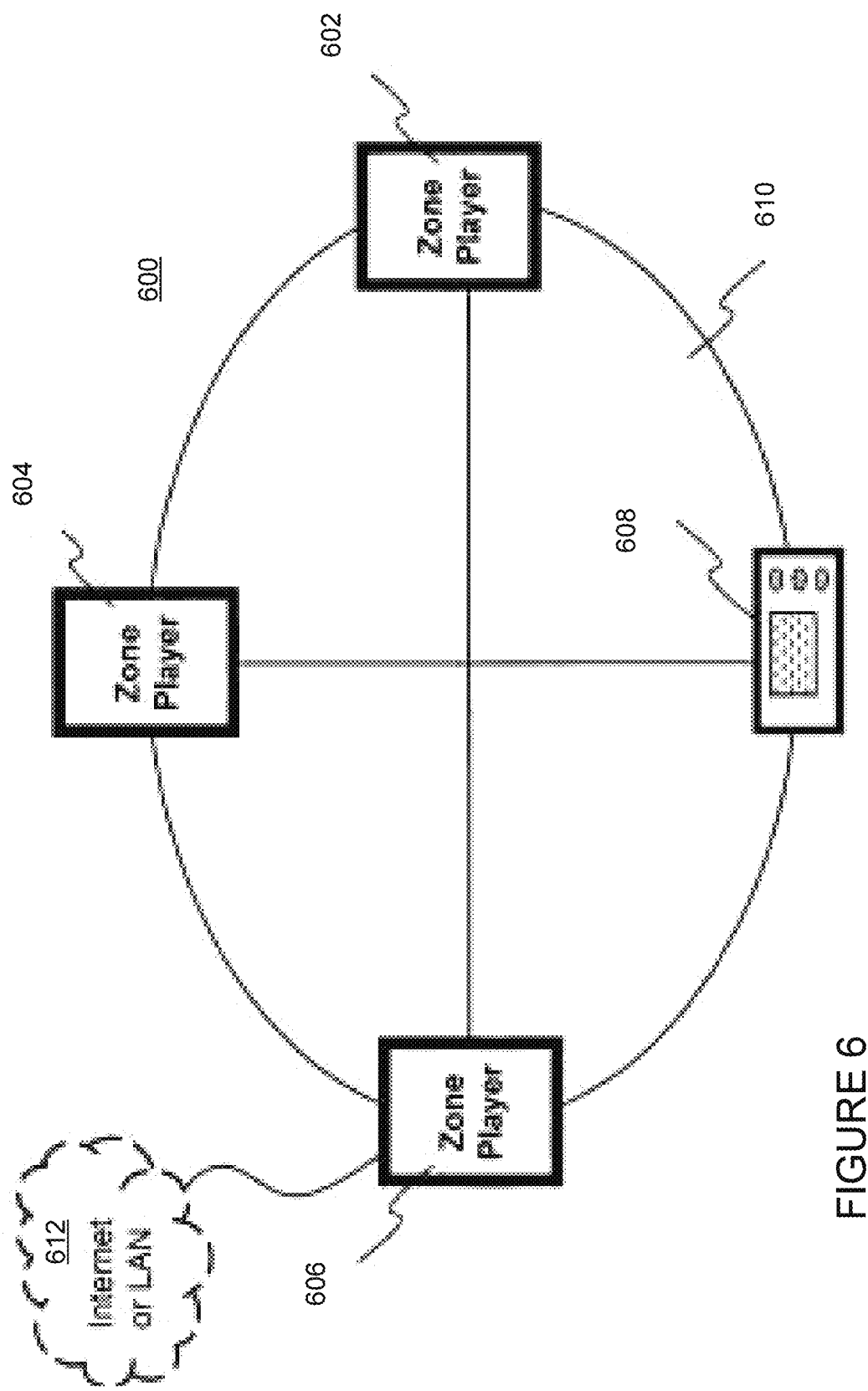
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

In certain embodiments, a rudimentary communication path is established to connect a zone player to a household or other location network. In reference to FIG. 6, for example, a zone player is not yet a member of a HOUSEHOLD. It is assumed that the zone player is to be added to become a member of the HOUSEHOLD by a cable or wireless. When the zone player is initially turned on, it executes an embedded module that is configured to establish a communication path with another device (e.g., network-enabled). The communication path facilitates the automatic configuration of the zone player via the other device. This communication path may operate over wireless and/or Ethernet protocols, as the zone player may be connected to one or both. In operation, the communication path does not negatively affect other devices in the vicinity and can reach all other members of the HOUSEHOLD (both CPs and ZPs), if any are available. In certain embodiments, the communication path does not have to be direct between two devices and may be bridged by one or more other devices. Because the communication path is only (or substantially) used for initial device configuration, it may not require significant performance or sophisticated functionality. There are at least two elements to establish the communication path: channel selection and packet exchange.

In certain embodiments, selection of an appropriate transmission channel (e.g., a radio frequency (RF) channel) is primarily an exercise in two constraints: finding a channel that is quiet from a protocol (e.g., 802.11) viewpoint (e.g., minimal conflicting wireless traffic) and finding a channel that is quiet from an RF viewpoint (e.g., minimal noise from other signals). Both of these tests may be applied because a home environment can have other RF (e.g., 2.4 GHz) traffic or potentially other wireless access points.

Channel selection can be accomplished, for example, with a scanning technique, namely the device listens on each channel for a period of time, looking for the presence of wireless beacons and other RF signals. In an embodiment, devices that are configured have a preferred channel for the HOUSEHOLD, and devices that are not configured have a pre-defined (default) channel or channels on which they rendezvous. For example, an 802.11 b/g channel can be pre-configured as the default channel. Alternatively, multiple channels, with a well-known frequency hopping sequence, can be used by the devices (e.g., using an aperiodic frequency change interval).

In certain embodiments, many hardware configurations only support reception/transmission on a single channel at a given time. Also there are configured and unconfigured devices that may use different channels for the bootstrap configuration and standard network operations (post-configuration communications). In certain embodiments, devices are placed in a "configuration" mode, whereby they use the appropriate channels for communication.

To enable communication between devices that are not part of the same HOUSEHOLD, a packet exchange network infrastructure is developed. Probing messages are sent in such a way that they traverse both the Ethernet and wireless networks, reaching any connected devices. Devices that are already in a HOUSEHOLD constitute a network infrastructure that can be used to exchange unicast and/or multicast/broadcast network frames between the devices. A device that is not yet in the HOUSEHOLD may have much more limited networking capability and may only receive data from devices to which it is directly wired, and unencrypted messages broadcast to all wireless networks operating in a particular channel of the RF spectrum, for example.

In certain embodiments, an IP address of a new device is not known to any members of the HOUSEHOLD. If the device is just wireless, it may not have an IP address at all, or it may have an automatically assigned IP address that is inaccessible to other devices with IP addresses respectively assigned by a DHCP server. To allow devices that are not members of the HOUSEHOLD to join the HOUSEHOLD, a transport may be constructed that can get data one "hop" beyond the HOUSEHOLD network infrastructure.

In certain embodiments, packets of data are broadcasted among the members of the HOUSEHOLD. The packets of data comprise a mixture of "probe" datagrams and IP broadcast. For example, the 802.11 "probe" datagrams are used to cross wireless network boundaries. In other words, the "probe" datagrams can be received by all listeners (e.g., other devices) on the channel, even those that are not configured with an SSID, because they are sent to the broadcasting satellite service (BSS) (e.g., FF:FF:FF:FF:FF:FF) to which all devices may be configured to listen. An IP broadcast is used on the wired network segments and the HOUSEHOLD network infrastructure to enable a PC-based controller to participate while running with standard user privileges (which allow access only to IP-based network services), for example. Used together, the combination of "probe" datagrams and IP broadcast provides for a broadcast datagram transport that allows even devices that have not had any networking parameters configured to communicate.

In certain embodiments, probe datagrams include a number of elements to facilitate the configuration of other devices to join the HOUSEHOLD. In an embodiment, each of the elements carries up to 255 bytes of data. An element contains data payload for each message used by the bootstrap procedure to invite others to join the HOUSEHOLD. This element is repeated as many times as necessary to carry the complete message. In an embodiment, the IP broadcast datagrams contain the same data payload as the normal IP data payload.

VI. Example Wireless Dock

Figure 7A:
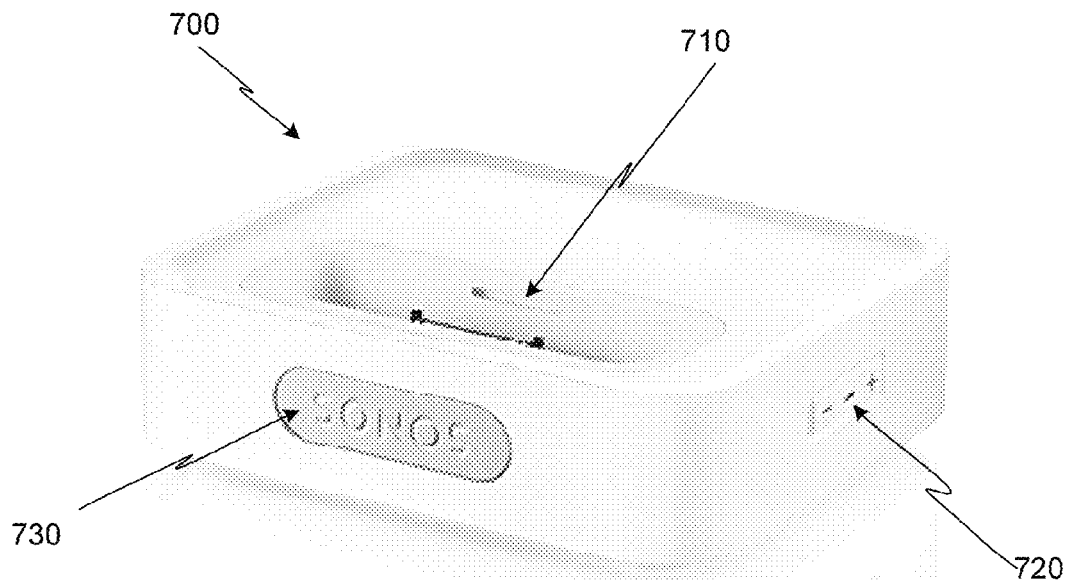
FIGS. 7A and 7B depict an example dock to connect a device for playback of content via a playback network.
Figure 7B:
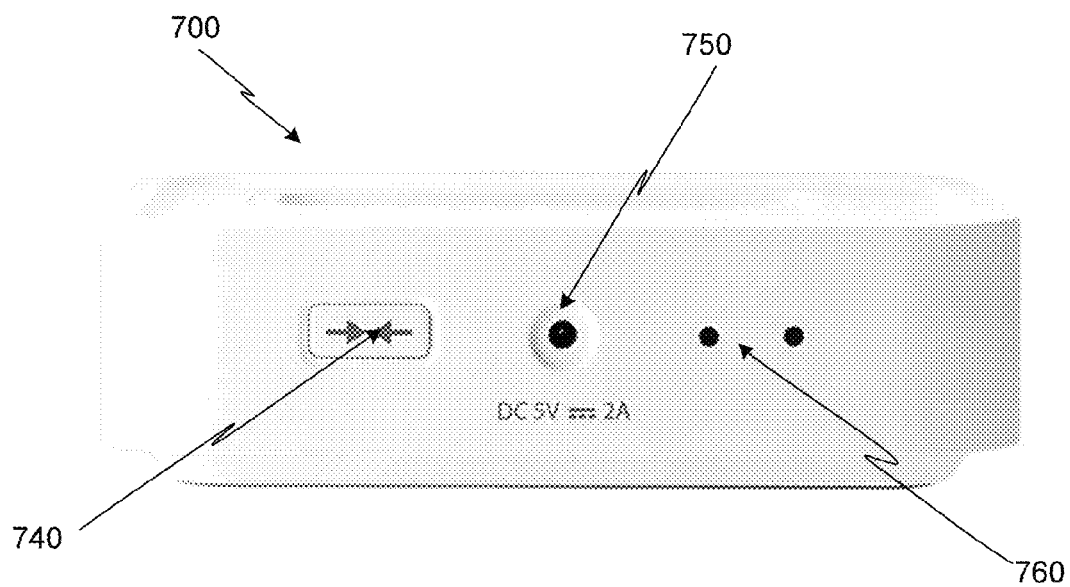

Certain embodiments provide a dock for a playback device, such as an Apple IPHONE®, IPOD®, and so on, to play multimedia content, such as an audio file, directly from the playback device via a playback network (e.g., SONOSNET™). In certain embodiments, the dock is recognized as a part of the network (e.g., a household network), and a device placed into or in association with the dock becomes a part of the playback network as well. The dock facilitates playback of content stored on the playback device, as well as content currently playing on the playback device. For example, music playing on an IPOD® before the IPOD® is docked will continue to play, through networked speakers, after the IPOD® is connected to the dock. In certain embodiments, the connected playback device is charged via the dock during content playback. FIG. 3 shows an example of a wireless dock 302 and a docked device 304. FIGS. 7A and 7B provide additional examples and description below.

FIGS. 7A and 7B depict an example dock 700 to connect a device for playback of content via a playback network. The example dock 700 includes a docking connection 710 for a playback device (e.g., an IPOD®, IPHONE®, and so on). In certain embodiments, the docking connection 710 includes a cable connecting the docking connection 710 to the dock 700 such that the docking connection 710 may be pulled out or extended from the body of the dock 700 to facilitate ease of connection of a device (e.g., an IPOD® or IPHONE® in a protective case) to the dock 700. The dock 700 includes an interface (e.g., a wireless or wired interface) to enable the dock 700 to communicate with a network (e.g., playback network 610, other external device (e.g., zone players 602, 604, 606, 608), or both the network and another external device to enable playback, control, or both playback and control of the docked device and its content over the network and/or external device, for example.

The example dock 700 also includes a volume control 720. In certain embodiments, the example dock 700 includes a logo button 730, which, for example, may be used to trigger a function, connect the dock 700 to a network, etc. Alternatively or additionally, the logo 730 may simply serve to identify the docket 700. As shown in the example of FIG. 7B, the dock 700 also includes a network join button 740 (e.g., a household network join button).

The example dock 700 may include a power connection 750 to power the dock 700 and facilitate charging of a docked device (e.g., according to a 1 amp specification and so on). In certain embodiments, power and/or charging may be provided by battery. In certain embodiments, no charging capability is provided, and the dock 700 is instead powered by the connected device.

The example dock 700 may also include one or more status indicators (e.g., lights) 760 to indicate a status of the dock 700 and/or docked device (e.g., a status of network connection, content playback, docked device control, and so on).

In certain embodiments, the docking connection 710 includes a wireless connection to connect a device to the dock 700 without physically attaching a connection between the device and the dock 700. As such, in certain embodiments, music playing on the portable device may be switched from a zone formed by the portable device to a networked playback device without physically connecting the portable device to the dock 700.

In certain embodiments, the dock 700 may include a line-out jack or other connection to allow the dock 700 to function as a zone player on the network and connect to a stereo or powered speakers. In certain embodiments, the dock 700 may accommodate multiple connections with docked devices for control and playback.

Using the dock 700, a user may select one or more available playback devices (e.g., zone players) in a playback network (e.g., SONOSNET™ or other secure Advanced Encryption Standard (AES) encrypted, peer-to-peer wireless mesh network) at which to play audio content stored on or being played via a playback device (e.g., an IPOD®, IPHONE®, etc.) connected to the dock 700. The dock 700 accesses digital music or other content stored on a docked playback device and sends the content (e.g., wirelessly) to playback devices in the connected network (e.g., zone players throughout a household). For example, digital music files can be sent wirelessly to connected playback devices throughout the playback network without converting the digital files to analog waveforms. Maintaining the digital data helps to ensure sound quality from the playback device connected to the dock 700 to the playback devices receiving the digital content for playback.

In certain embodiments, autoplay allows a device to be docked such that music that has been playing on the device automatically starts playing on one or more zones via the dock 700. For example, stored content, streaming music applications, and so on may be played on the playback network via the docked device. In certain embodiments, audio content is played as high fidelity quality audio without converting digital content to analog content. In certain embodiments, audio content from a docked device may be provided via synchronized playback in multiple rooms or zones in the network.

In certain embodiments, stored content may be browsed via either a docked device or a controller connected to the playback network. For example, a menu may be displayed on the docked device, on a separate controller (such as controller 608), or on both the docked device and the controller for user review and selection of content for playback.

In certain embodiments, the dock 700 supports playback of a variety of audio and/or other media formats including compressed MP3, iTunes Plus, WMA (including purchased Windows Media downloads), AAC (MPEG4), Ogg Vorbis, Audible (format 4), Apple Lossless, Apple Fairplay, AAC Enhanced, Flac (lossless), WMA Lossless, and so on, for audio (e.g., music) and/or other media files, as well as uncompressed waveform audio file format (WAV) files, audio interchange file format (AIFF) files, and so on. In certain embodiments, the dock 700 provides native support for a variety of sample rate, such as 44.1 kHz sample rates, as well as additional support for 48 kHz, 32 kHz, 24 kHz, 22 kHz, 16 kHz, 11 kHz, and 8 kHz sample rates, and so on.

In operation, for example, the dock 700 is connected (e.g., plugged in to a power source) and added to a local playback network. The dock 700 may be added to a network, such as the network 610, as another device 602, 604, 606, 608. Then, a playback device, such as an IPOD® or IPHONE®, is docked. A user may then select to browse on the docked device or another device or controller to access a collection of music or other content on the docked device. In certain embodiments, the dock 700 may include a browse button to initiate review of the collection of content on the docked device. The user may then select one or more items (e.g., music tracks) for playback. In certain embodiments, one or more items may be randomly or automatically selected for playback without user intervention (e.g., based on a setting, after a certain elapsed period of time without user input, and so on).

As such, in certain embodiments, the dock 700 converts a docked device into a pseudo-networked drive, allowing playback of content stored and/or accessible via the docked device in any zone of a playback network or networks to which the dock 700 is connected. Using the dock 700 allows a user to provide content to the playback devices (e.g., zone players, speakers, and so on) on the network without using a power-hungry computer and without requiring network accessible storage drive setup and management. A user may dock a device with the dock 700 and be able to play or continue ongoing play of content from the docked device. For example, the dock 700 or the docked device (or both) may be configured to have music automatically being playing in a certain zone when the device is docked. As another example, the last song playing on the device before it is docked may resume (e.g., seamlessly or substantially seamlessly resume playing to the user) or restart playing via the dock 700 once the device is connected. In certain embodiments, any device with content for playback may be connected to the dock 700, regardless of pre-configuration.

In certain embodiments, the dock 700 may be a wireless dock enabling connection of a playback device to a speaker or other playback output in an absence of a playback network. For example, the dock 700 may allow a device, such as an IPOD®, IPHONE®, and so on, to playback audio content via a vehicle's speakers by tuning a transmitter in the dock 700 to an appropriate frequency for audio playback over the vehicle speakers.

As such, in certain embodiments, a docked device need not have its own network interface or connection but may instead rely on the dock 700 to connect to a network or other device for playback of content stored on or available through the docked device.

Figure 8:
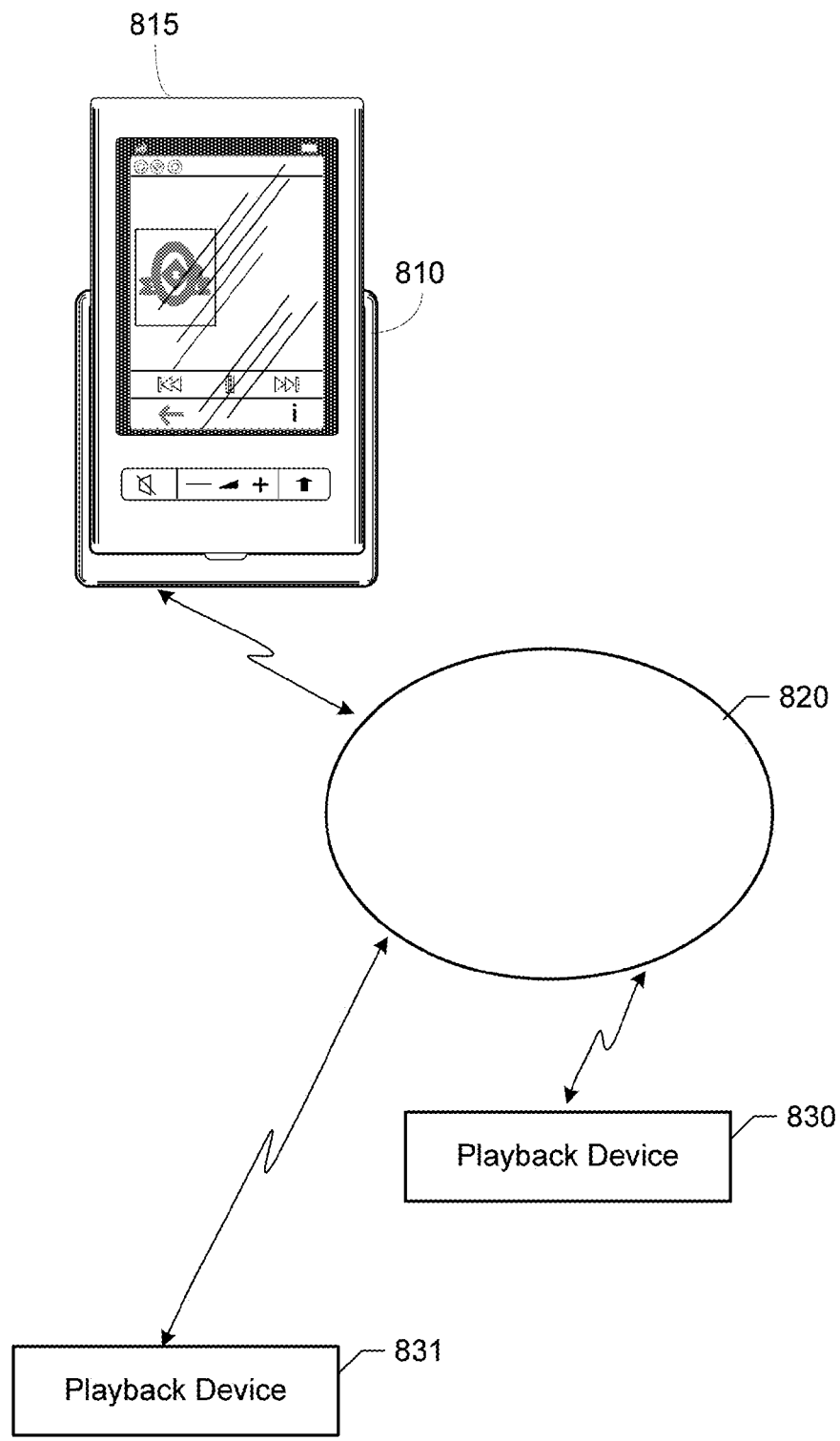
FIG. 8 illustrates an example playback network configuration including a dock allowing a mobile device to interface with one or more playback devices via a network.

FIG. 8 illustrates an example playback network 800 configuration including a dock 810 allowing a mobile device 815 to interface with one or more playback devices 830-831 via a network 820. The mobile device 815 is inserted into the dock 810. The dock 810 is connected to the network 820 and allows the mobile device 815 to provide content (e.g., audio content, such as music) for playback via one or more of the playback devices 830-831 forming part of the network. Through a connection to the network 820 facilitated by the dock 810, the mobile device 815 may be used to control one or more playback devices 830-831, for example. Through a connection to the network 820 facilitated by the dock 810, one or more playback devices 830-831 may be used to control the mobile device 815, for example. Through a connection to the network 820 facilitated by the dock 810, one or both of the mobile device 815 and one or more playback devices 830-831 may be used to browse content available for playback, for example.

Thus, certain embodiments provide a dock or connection to allow a device to communicate with a playback network, such as example playback network 800, to control, be controlled, and/or provide content to one or more devices on the network. For example, a remote device may be used to browse and trigger playback of content at a docked device. A remote device may be used to browse and execute functionality on the docket device, for example. In certain embodiments, a playback device or zone player may utilize and control functionality on the docked device to playback and/or distribute content without having that functionality on the playback device or zone player itself.

Content from a docked device may be played in one or more different zones, for example. In certain embodiments, a default zone may be provided for automatic playback of content from a docked device. In certain embodiments, a dock, such as dock 700 and/or dock 810, may serve as a wireless extender for a playback network to extend a range of the playback network.

Figure 9:
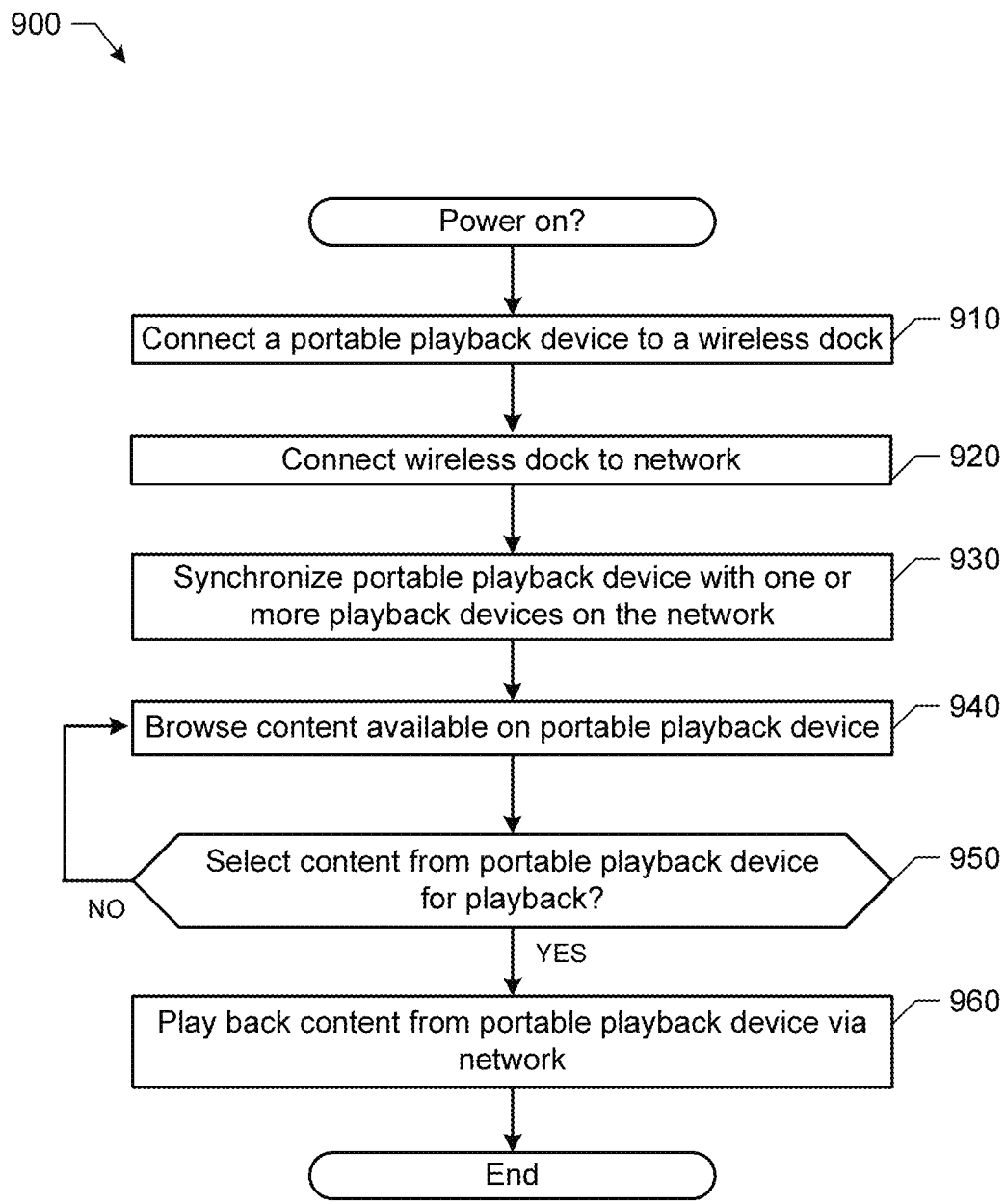
FIG. 9 illustrates a flow diagram for an example method for connection of a portable playback device to a network for content playback via a wireless dock.

FIG. 9 illustrates a flow diagram for an example method 900 for connection of a portable playback device to a network for content playback via a wireless dock. At block 910, a portable playback device is connected to a wireless dock. For example, a device, such as an IPOD®, IPHONE®, and so on, may be inserted into the dock 302, 700, 810.

At block 920, the wireless dock connects to a network. For example, the dock 302, 700, 810 connects to the playback network 610, 820. At block 930, the portable playback device is synchronized with one or more playback devices also connected to the playback network. For example, the portable playback device may synchronize with one or more zone players on a household network such that the one or more zone players may playback content on the docked portable playback device.

At block 940, content available on or via the portable playback device is browsed. Content may be browsed using the portable playback device, the dock, the one or more playback devices, and so on. At block 950, content from the portable playback device is selected for playback. For example, a song may be selected from a menu at or available from the docked portable playback device. At block 960, selected content is played back through one or more playback devices connected to the network. For example, a selected song from the docked portable playback device is played via one or more zone players on the network.

While examples have been illustrated in the figures, one or more of the interfaces, data structures, elements, processes and/or devices illustrated in the figures may be combined, divided, re-arranged, omitted, eliminated and/or implemented in any way. Further, the example components can be implemented by hardware, software, firmware and/or any combination of hardware, software and/or firmware. Thus, for example, any of the example components described with respect to the figures could be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example components is hereby expressly defined to include a computer readable medium such as a memory, DVD, CD, and so on, storing the software and/or firmware. Further still, the examples can include one or more elements, processes and/or devices in addition to, or instead of, those illustrated in the figures, and/or can include more than one of any or all of the illustrated elements, processes and devices.

In view of the foregoing, it should be apparent that disclosed example systems, methods, apparatus, and articles of manufacture can be used to control audio playback devices. Some example systems, methods, apparatus, and articles of manufacture advantageously allow for simpler control of an audio system, including an audio playback device and an audio information source, from the perspective of a user of the system. In some such examples, the user of the system can control the playback of audio using any of multiple user input devices that can be configured to communicate with different elements of the system. Some example systems, methods, apparatus, and articles of manufacture disclosed herein permit the user of an audio system including an audio playback device and an audio information source to control the audio volume and audio input source using a user input device that is configured to communicate with the audio information source but is not configured to communicate with the audio playback device.

Example systems, methods, apparatus, and articles of manufacture disclosed herein maintain a consistent volume when changing between different audio information sources, where one or more of the different audio information sources have independent and/or different volume settings.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art.

VII. Conclusion

Certain examples provide a dock or wireless connection to allow a device including and/or otherwise able to access media content to communicate with a playback network to control, be controlled, and/or provide content to one or more other playback devices on that network. For example, a remote device may be used to browse and trigger playback of content at a docked device. A remote device may be used to browse and execute functionality on the docket device, for example. A playback device or zone player may utilize and control functionality on the docked device to playback and/or distribute content without having that functionality on the playback device or zone player itself. Content from a docked device may be played in one or more different zones established on the playback network, for example. A dock may serve as a wireless extender for a playback network to extend a range of the playback network, for example. Content may be provided from a docked device to devices on a local network in its original form (e.g., without conversion from digital to analog), for example.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A method comprising:
   detecting, by a first zone player, a connection between a dock interface of the first zone player and a portable device, the dock interface providing communication between the portable device and a second zone player, wherein the second zone player is part of a first set of zones in a playback network that does not include the first zone player;
   responsive to the detection, transmitting to the second zone player, data to cause the second zone player to modify one or more parameters of the second zone player according to a zone scene, wherein the zone scene comprises a second set of zones that (i) is different from the first set of zones and (ii) comprises the second zone player and one or more other zone players in the playback network;
   responsive to the detection, determining that the portable device was playing a media item and transmitting, to the second zone player, data indicating the media item; and
   causing, via the dock interface, playback of the media item from the portable device by the first zone player and the second zone player while the second zone player is in the second set of zones.

2. The method of claim 1, wherein causing playback of the media item comprises, responsive to the detection, automatically causing, via the dock interface, playback of the media item.

3. The method of claim 1, wherein detecting the connection between the dock interface and the portable device comprises detecting a wireless connection between the dock interface and the portable device.

4. The method of claim 1, wherein the zone scene comprises a zone group comprising the first zone player and the second zone player.

5. The method of claim 1, wherein the zone scene comprises a zone group comprising the second zone player and not comprising the first zone player.

6. The method of claim 1, wherein the media item comprises a media item stored on the portable device.

7. The method of claim 1, wherein the media item comprises a media item streamed to the portable device.

8. The method of claim 1, wherein the portable device comprises a third zone player.

9. The method of claim 1, further comprising:
before the detection, receiving from the portable device a playback command.

10. A tangible, non-transitory computer readable storage medium including instructions for execution by one or more processors, wherein the instructions, when executed, cause a first zone player to implement a method comprising:
detecting, by the first zone player, a connection between a dock interface of the first zone player and a portable device, the dock interface providing communication between the portable device and a second zone player, wherein the second zone player is part of a first set of zones in a playback network that does not include the first zone player;
responsive to the detection, transmitting to the second zone player, data to cause the second zone player to modify one or more parameters of the second zone player according to a zone scene, wherein the zone scene comprises a second set of zones that (i) is different from the first set of zones and (ii) comprises the second zone player and one or more other zone players in the playback network;
responsive to the detection, determining that the portable device was playing a media item and transmitting, to the second zone player, data indicating the media item; and
causing, via the dock interface, playback of the media item from the portable device by the first zone player and the second zone player while the second zone player is in the second set of zones.

11. The tangible, non-transitory computer readable storage medium of claim 10, wherein causing playback of the media item comprises, responsive to the detection, automatically causing, via the dock interface, playback of the media item.

12. The tangible, non-transitory computer readable storage medium of claim 10, wherein detecting the connection between the dock interface and the portable device comprises detecting a wireless connection between the dock interface and the portable device.

13. The tangible, non-transitory computer readable storage medium of claim 10, wherein the zone scene comprises a zone group comprising the first zone player and the second zone player.

14. The tangible, non-transitory computer readable storage medium of claim 10, wherein the zone scene comprises a zone group comprising the second zone player and not comprising the first zone player.

15. The tangible, non-transitory computer readable storage medium of claim 10, wherein the media item comprises a media item stored on the portable device.

16. The tangible, non-transitory computer readable storage medium of claim 10, wherein the media item comprises a media item streamed to the portable device.

17. The tangible, non-transitory computer readable storage medium of claim 10, wherein the portable device comprises a third zone player.

18. A first zone player comprising:
one or more processors; and
a tangible, non-transitory computer readable storage medium including instructions for execution by the one or more processors, wherein the instructions, when executed, cause the first zone player to implement a method comprising:
detecting a connection between a dock interface of the first zone player and a portable device, the dock interface providing communication between the portable device and a second zone player, wherein the second zone player is part of a first set of zones in a playback network that does not include the first zone player;
responsive to the detection, transmitting to the second zone player, data to cause the second zone player to modify one or more parameters of the second zone player according to a zone scene, wherein the zone scene comprises a second set of zones that (i) is different from the first set of zones and (ii) comprises the second zone player and one or more other zone players in the playback network;
responsive to the detection, determining that the portable device was playing a media item and transmitting, to the second zone player, data indicating the media item; and
causing, via the dock interface, playback of the media item from the portable device by the first zone player and the second zone player while the second zone player is in the second set of zones.

* * * * *